(12) United States Patent
Boutnaru

(10) Patent No.: US 10,706,150 B2
(45) Date of Patent: Jul. 7, 2020

(54) DETECTING MALICIOUS SOFTWARE BY INSPECTING TABLE LOOK-ASIDE BUFFERS

(71) Applicant: PayPal, Inc., San Jose, CA (US)

(72) Inventor: Shlomi Boutnaru, Modiin (IL)

(73) Assignee: PayPal, Inc., San Jose, CA (US)

(*) Notice: Subject to any disclaimer, the term of this patent is extended or adjusted under 35 U.S.C. 154(b) by 133 days.

(21) Appl. No.: 15/841,033

(22) Filed: Dec. 13, 2017

(65) Prior Publication Data

US 2019/0180031 A1   Jun. 13, 2019

(51) Int. Cl.
| | | |
|---|---|---|
| *G06F 21/56* | (2013.01) | |
| *G06F 21/55* | (2013.01) | |
| *G06F 12/1009* | (2016.01) | |
| *G06F 12/1027* | (2016.01) | |
| *G06F 21/12* | (2013.01) | |
| *G06F 21/78* | (2013.01) | |

(52) U.S. Cl.
CPC ........ *G06F 21/566* (2013.01); *G06F 12/1009* (2013.01); *G06F 12/1027* (2013.01); *G06F 21/121* (2013.01); *G06F 21/554* (2013.01); *G06F 21/78* (2013.01)

(58) Field of Classification Search
CPC .. G06F 21/566; G06F 21/121; G06F 12/1027; G06F 21/554; G06F 12/1009
See application file for complete search history.

(56) References Cited

U.S. PATENT DOCUMENTS

| | | | | |
|---|---|---|---|---|
| 7,263,585 B2* | 8/2007 | Hooker | ................. | G06F 9/3812 711/119 |
| 7,475,220 B1* | 1/2009 | Hastings | ............ | G06F 12/1475 711/154 |
| 8,301,865 B2* | 10/2012 | Grohoski | ............ | G06F 12/1027 711/200 |
| 8,856,789 B2* | 10/2014 | Torrey | ................ | G06F 9/45558 718/1 |
| 10,237,059 B2* | 3/2019 | Sethumadhavan | ......... | G06F 12/0897 |
| 2008/0282055 A1* | 11/2008 | Yang | ................... | G06F 12/1027 711/207 |
| 2016/0092371 A1* | 3/2016 | Shanbhogue | ....... | G06F 12/1009 711/207 |
| 2017/0097898 A1* | 4/2017 | Durham | ................ | G06F 9/3005 |
| 2019/0042745 A1* | 2/2019 | Chen | .................... | G06F 21/566 |

(Continued)

OTHER PUBLICATIONS

Shane Macaulay, "Killing the rootkit—perfect physical memory process detection," IOActive, Inc., 2014, 28 pages.

(Continued)

*Primary Examiner* — Christopher A Revak
(74) *Attorney, Agent, or Firm* — Haynes and Boone, LLP

(57) ABSTRACT

Systems and methods that detect presence of malicious software while comparing address mappings in multiple table look-aside buffers are provided. Address mappings in an instruction table look-aside buffer (ITLB) and a data table look-aside buffer (DTLB) may be scanned with each address mapping including a mapping between a virtual page in a virtual memory and a frame in a physical memory of a computing device. A discrepancy between an address mapping in the ITLB and an address mapping in the DTLB can be identified. Based on the discrepancy, a process associated with the mapping may then be identified as a malicious process.

20 Claims, 15 Drawing Sheets

(56) References Cited

U.S. PATENT DOCUMENTS

2019/0102547 A1\* 4/2019 Aktas ................ G06F 21/56
2019/0228155 A1\* 7/2019 Basak ............... G06F 21/566

OTHER PUBLICATIONS

Sherri Sparks, Jamie Butler, "Shadow Walker—Raising the Bar for Rootkit Detection," Black Hat Japan 2005, 55 pages.

\* cited by examiner

DETECTING MALICIOUS SOFTWARE BY INSPECTING TABLE LOOK-ASIDE BUFFERS

TECHNICAL FIELD

The disclosure generally relates to malicious software detection, and more specifically to identifying malicious software by examining memory addresses stored in the translation look-aside buffers.

BACKGROUND

Modern malware that has infected a computer system may attempt to take certain steps to hide itself from detection. The longer that malware stays undetected, the more control it may gain over a system and/or an associated network of computing devices. Some types of malware may be particularly difficult to detect and/or mitigate.

Figure 1:
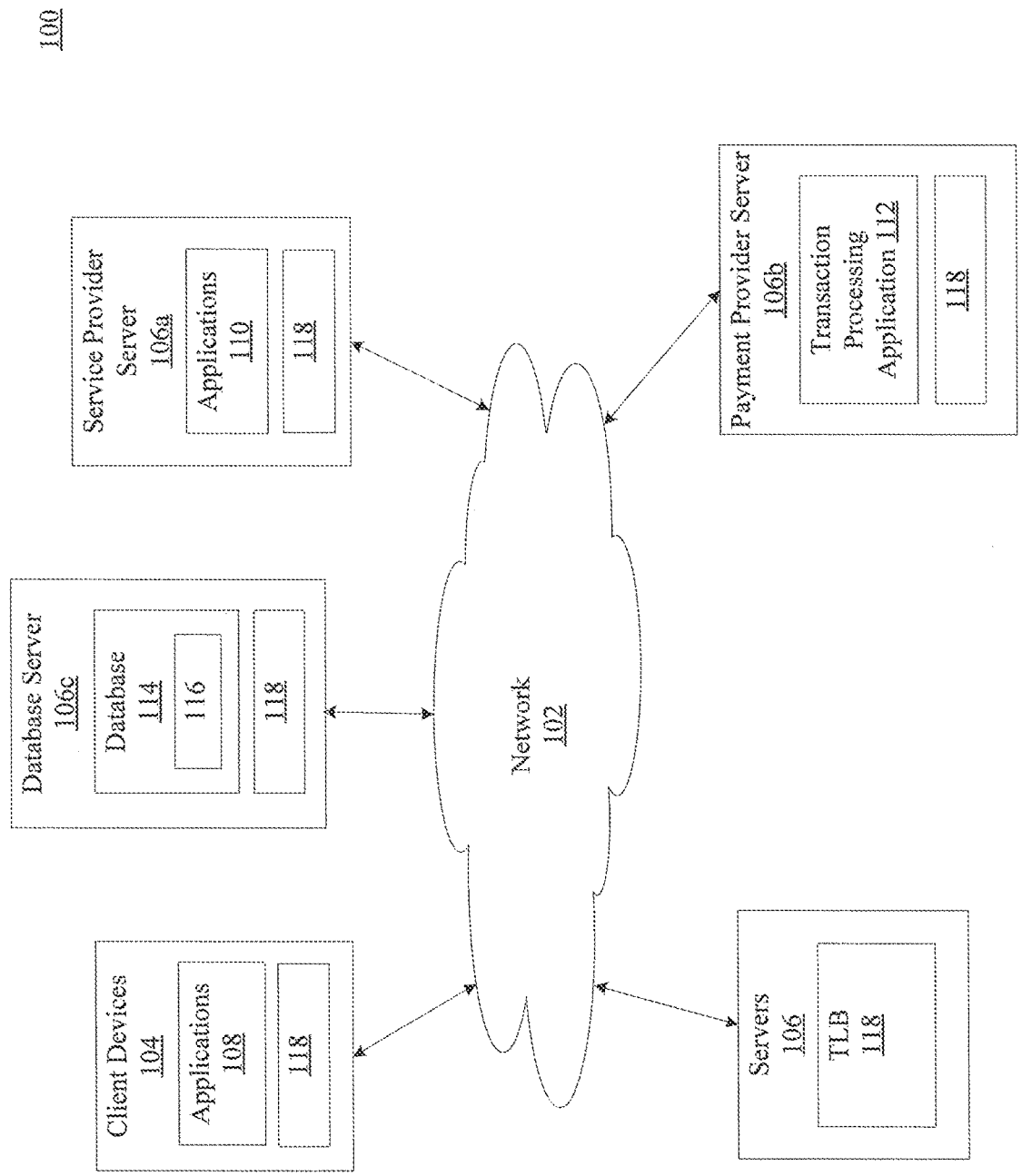
FIG. 1 is a diagram of an exemplary system where embodiments can be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations, and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

A memory management unit ("MMU") manages virtual and physical memories in a computing device. The MMU is a hardware component that maps virtual pages in the virtual memory to frames in the physical memory. The MMU may also use a memory cache, such as a table look-aside buffer ("TLB"), to reduce access time for identifying the address mappings between virtual pages in virtual memory and frames in physical memory.

A computing device may include multiple TLBs, such as an instruction TLB and a data TLB. The instruction TLB stores the address mappings between the virtual pages and frames for instructions that may be executed by the computing device. The data TLB stores the address mappings between the virtual pages and frames for data.

However, when malicious software exists in a computing device, the address mappings between the virtual pages and frames that are associated with the malicious software are also stored in the instruction TLB and the data TLB. As described in the embodiments below, malicious software may be detected using the address mappings between virtual memory and physical memory that are stored in the instruction TLB and the data TLB.

The disclosure provides systems, methods, and computer program products for identifying whether malicious software exists on a computing device. To identify malicious software, a table look-aside buffer "watcher" ("TLB watcher") is installed on a computing device. The TLB watcher scans address mappings in an instruction table look-aside buffer (ITLB) and address mappings in a data table look-aside buffer (DTLB). Each address mapping in the DTLB and the ITLB maps a virtual address of a virtual page in the virtual memory to a physical address of a frame in the physical memory. The TLB watcher determines a discrepancy between an address mapping in the ITLB and an address mapping in the DTLB. Based on the discrepancy, the TLB watcher determines whether a process is generated by a malicious software.

In an embodiment, the TLB watcher determines that a virtual address of the address mapping in the ITLB is the same as a virtual address of the address mapping in the DTLB. The TLB watcher also determines that a physical address of the address mapping in the ITLB is different from a physical address of the address mapping in the DTLB. When the physical address of the address mapping in the ITLB is different from the physical address of the address mapping in the DTLB, the TLB watcher determines that a process associated with the mapping in the ITLB and the DTLB was generated by malicious software.

In an embodiment, the TLB watcher determines that a virtual address of the address mapping in the ITLB is the same as a virtual address of the address mapping in the DTLB. The TLB watcher also determines that a physical address of the address mapping in the ITLB is different from a physical address of the address mapping in the DTLB. When the physical address of the address mapping in the ITLB is the same as the physical address of the address mapping in the DTLB, the TLB watcher determines a process associated with the mapping in the ITLB and the DTLB was generated by non-malicious software.

In an embodiment, the TLB watcher determines a virtual address of the address mapping in the DTLB that does not have the same virtual address in the address mapping in the ITLB. In this case, the TLB watcher determines that there is no code to be executed, and does not identify a process associated with the mapping in the DTLB, but not ITLB as generated by malicious or non-malicious software. In an embodiment, TLB watcher may ignore the process.

In an embodiment, the TLB watcher determines a virtual address of the address mapping in the ITLB that does not have the same virtual address in the address mapping in the DTLB. The TLB watcher then generates an action that inserts an address mapping in the DTLB by reading a configurable number of pages before and/or after the address mapping with the same virtual address as the address mapping in the ITLB. Once the address mapping is inserted, the TLB watcher compares a physical address of the address mapping in the ITLB to a physical address of the inserted address mapping in the DTLB. If the physical address of the address mapping in the ITLB does not match to the physical address of the inserted address mapping in the DTLB, the TLB watcher determines a process associated with the mapping in the ITLB and the DTLB was generated by malicious software.

Using various embodiments described herein, the TLB watcher may prevent malicious code from executing in a computing device. This, in turn, will prevent the malicious code from stealing user data, transmitting user data to unauthorized third parties, encrypting user data and holding the user data from ransom, and disturbing expected operations of the computing device, creating unauthorized accounts, etc.

FIG. 1 is an exemplary system 100 where embodiments can be implemented. System 100 includes a network 102, client devices 104, and servers 106.

Network 102 may be implemented as a single network or a combination of multiple networks. For example, in various embodiments, network 102 may include the Internet or one or more intranets, landline networks, wireless networks, and/or other appropriate types of networks. Network 102 may be a small-scale communication network, such as a private or local area network, or a larger scale network, such as a wide area network, accessible by the various components of system 100.

Client devices 104 may be portable and non-portable electronic devices under control of a user and configured to transmit, receive, and manipulate data received from different servers 106 over network 102. Example client devices 104 include desktop computers, laptop computers, mobile devices, tablets, smartphones, wearable computing devices, eyeglasses that incorporate computing devices, implantable computing devices, etc.

Client devices 104 may include one or more applications 108. Applications 108 may be pre-installed on the client devices 104, installed on the client devices 104 using portable memory storage devices, such as compact disks or thumb-drives, or be downloaded to the client devices 104 from servers 106. Applications 108 may execute on the client devices 104 and receive instructions and data from a user, and send and transmit instructions and data to servers 106.

Applications 108 may provide various services to users using client devices 104. Example applications 108 installed on client devices 104 may be payment transaction applications. Payment transaction applications may be configured to transfer money world-wide, receive payments for goods and services, manage money spending, etc. Further, applications 108 may be under an ownership or control of a payment service provider, such as PAYPAL™ Inc. of San Jose, Calif., USA, a telephonic service provider, a social networking service provider, and/or other service providers. Applications 108 may also be analytics applications. Analytics applications perform business logic, provide services, and measure and improve performance of services and functions of other applications that execute on client devices 104 based on current and historical data. Applications 108 may be security applications for implementing client-side security features, programmatic client applications for interfacing with appropriate application programming interfaces (APIs) over network 102. Applications 108 may be communication applications, such as email, text, voice, and instant message applications that allow a user to send and receive emails, calls, texts, and other notifications through network 102. Applications 108 may be location detection applications, such as a mapping, a compass, and/or a global positioning system (GPS) application. Applications 108 may be social networking applications and/or merchant applications. Applications 108 may be service applications that permit a user of client device 104 to receive, request and/or view information for products and/or services, and also permit the user to purchase the selected products and/or services.

Applications 108 may utilize numerous components included in client devices 104 to display, receive input from a user, store data, process data, transmit data, and communicate other client devices 104 and servers 106 over network 102. Example components are discussed in detail in FIG. 10.

Server 106 may be a computer device or a software program that provides functionality to other devices in network 102, such as client devices 104. A server may serve multiple client devices 104. For example, server 106 may provide services and/or data to client devices 104, store data on behalf of client devices 104, etc. Example servers 106 may include service provider servers, payment provider servers, database servers, file servers, mail servers, print servers, application servers, game servers, etc. There may be hundreds or thousands of servers connected to network 102. Example service provider server 106a, payment provider server 106b, and database server 106c are described below.

Service provider server 106a may provide services to multiple applications 108 that execute on client devices 104. Service provider server 106a may also be maintained by a service provider, such as PAYPAL™, a telephonic service provider, social networking service, and/or other service providers.

Service provider server 106a may execute applications 110 to receive, process, and transmit data for user requested products and/or services transmitted from client devices 104. Thus, applications 110 may be financial services applications configured to transfer money world-wide, receive payments for goods and services, manage money spending, etc. In an embodiment, applications 110 may also be security applications configured to implement client-side security features or programmatic client applications for interfacing with appropriate application programming interfaces (APIs) over network 102. In another embodiment, applications 110 may be communication applications that perform email, texting, voice, and instant messaging functions that allow a user to send and receive emails, calls, texts, and other notifications over network 102. In yet another embodiment, applications 110 may be location detection applications, such as a mapping, compass, and/or GPS applications. In yet another embodiment, applications 110 may also be incorporated into social networking applications and/or merchant applications.

When applications 108 transmit requests and/or data to applications 110, applications 110 may process the requests and data. For example, applications 110 may request payment from a user using application 108 to process the requests. Application 110 may use payment provider server 106*b* to process the payment requests. For instance, the payment provider server 106*b* may receive payment requests from applications 110, 112 that cause the payment provider server 106*b* to transfer funds of a user using application 108 to service provider associated with the service provider server 106*a*.

Payment provider server 106*b* may include one or more transaction or payment processing applications 112. Payment processing applications 112 facilitate transfer of funds between one or more parties, or applications, such as applications 108 and 110. Payment processing applications 112 may be configured to receive information from one or more applications 108, 110 executing on client devices 104 and/or service provider server 106*a* for processing and completion of financial transactions. Financial transactions may include financial information corresponding to user debit/credit card information, checking account information, a user account (e.g., payment account with a payment provider server 106*b*), or other payment information. Transaction processing application 112 may complete the financial transaction for the purchase request by providing payment to application 110 executing on service provider server 106*b*. Transaction processing application 112 may also provide transaction histories, including receipts, to client device 104 in order to provide proof of purchase for an item and/or service.

In order to complete financial transactions (or other transactions), payment provider server 106*b* (or another server 106) may store transactions in database 114. Database 114 may be a collection of tables, schemas, queries, views, etc. that are stored in memory suitable to store large quantities of data, such as a memory described in FIG. 6. Database 114 may be hosted on database server 106*c* and is accessible to applications 108, 110, and 112 via messages in a form of queries. Payment provider server 106*b* may establish user accounts 116 in database 114. Each user account 116 may be associated with one or more users using application 108 with payment provider server 106*b* to facilitate payment for goods and/or services offered by applications 110. User accounts 116 may include user information, such as name, address, birthdate, payment/funding information, travel information, additional user financial information, and/or other desired user data.

Because user information is valuable to fraudsters, such as for unauthorized use of an account or creating unauthorized accounts, fraudsters may use different means to obtain user information. For example, malicious software may be installed on client devices 104 and servers 106. The malicious software may attempt to collect client data, such as confidential client and payment information, interfere with operations of client devices 104 and servers 106, transmit the confidential data to unauthorized third parties, encrypt and hold data hostage, etc. To detect the malicious software, client devices 104 and servers 106 may include a TLB watcher (table look-aside buffer watcher) 118, described in detail below.

Figure 2:
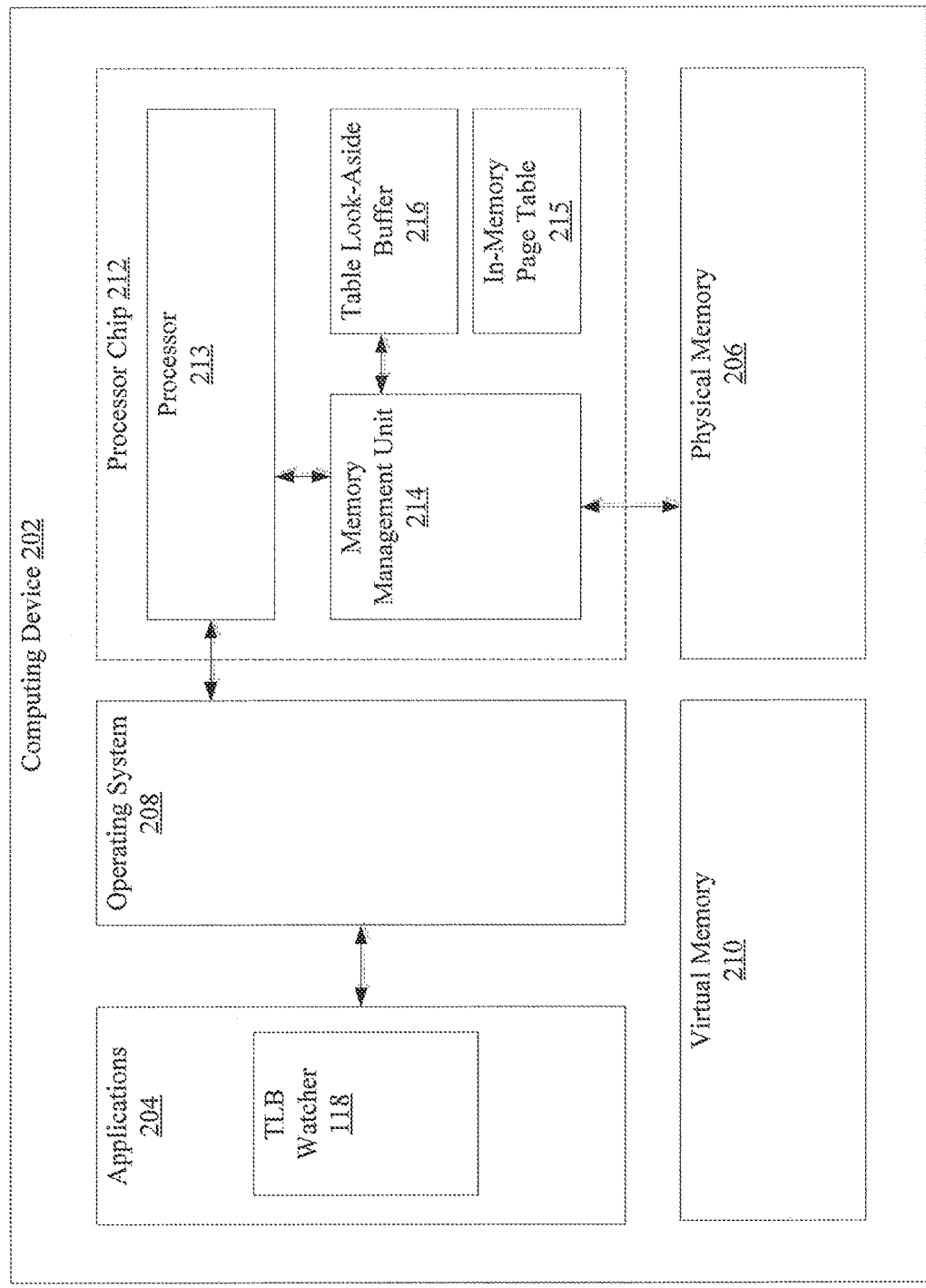
FIG. 2 is a block diagram of a computing device, according to an embodiment.

FIG. 2 is a block diagram 200 of a computing device that includes TLB watcher 118, according to an embodiment. As illustrated in FIG. 2, computing device 202 may execute one or more applications 204. Example application 204 may be applications 108, 110, or 112 described in FIG. 1 in some embodiments, or another type of application. As described in FIG. 1, applications 204 process requests generated by a user or received from other computing devices. As part of the processing the requests, applications 204 may read, write, and manipulate data in the memory of computing device 202. Additionally, instructions that may read, write, and manipulate data may also be stored in memory of computing device 202.

In an embodiment, computing device 202 may include a physical memory 206 and a virtual memory 210. Physical memory 206 may include persistent memory resources, such as one or more memory caches, hard drives, etc. Virtual memory 210 may be a memory management technique that abstracts the resources in physical memory 206 available on computing device 202 from applications 204. In this way, virtual memory 210 frees applications 204 from managing resources in physical memory 206 and provides an illusion of a single large physical memory 206 available on computing device 202, irrespective of a number of various physical memory resources that actually exits in physical memory 206. In an embodiment, when applications 204 access memory to process the requests, applications 204 access virtual memory 210, but the data and instructions that are used to process the request are actually stored in physical memory 206.

In an embodiment, operating system 208 manages memory resources of computing device 202 on behalf of applications 204. Operating system 208 may be a software program that executes on computing device 202. Generally, operating system 208 may provide applications 204 with access to hardware and software resources available on computing device, such as various services provided by other computing programs executing on computing device 202, task scheduling, access to a processor chip 212, memory management, etc.

To manage memory of computing device 202, operating system 208 may allocate a portion of virtual memory 210 to one or more applications 204 or processes or threads spawned by the applications 204. In an embodiment, processes or threads may execute concurrently or sequentially and process different tasks assigned by applications 204. Operating system 208 may also translate requests to access virtual memory 210 from applications 204 into physical addresses in physical memory 206 where data and instructions requested in the requests are actually stored. For example, when application 204 issues a request to read, write, and/or modify data and/or instructions, application 204 may generate a request to virtual memory 210 via operating system 208. The memory request may include a virtual address in virtual memory 210 that stores data or instructions utilized by application 204. Operating system 208 may then use a processor chip 212 to translate the virtual address into a physical address in physical memory 206 that will store or stores the requested data/instructions. The operating system 208 may then access the location in physical memory to store and/or retrieve the data and/or instructions.

Processor chip 212 may be an integrated circuit that incorporates processor 213, memory management unit 214 (also referred to as MMU 214), table look-aside buffer 216 (also referred to a TLB 216), and other hardware components. The example processor 213 may be a central processing unit ("CPU") that receives instructions and performs basic arithmetic, logical, control and input/output operations based on the instructions. The instructions may be instructions to read, write, and/or modify data or instructions that are stored in physical memory 206 of computing device 202. To read, write, and/or modify data and/or instructions, processor 213 may receive a request from operating system 208. In turn, operating system 208 may have received the request from applications 204. In an embodiment, processor 213 may use MMU 214 to translate virtual addresses included in the request into locations in physical memory 206, as will be discussed below.

In computing device 202, MMU 214 may manage virtual memory 210 and physical memory 206. To manage virtual memory 210, MMU 214 may divide the virtual address space in virtual memory 210 into virtual pages and the physical address space in physical memory 206 into frames. MMU 214 may then map virtual pages in virtual memory 210 to frames in physical memory 206 based on requests for memory resources made by applications 204.

Figure 3:
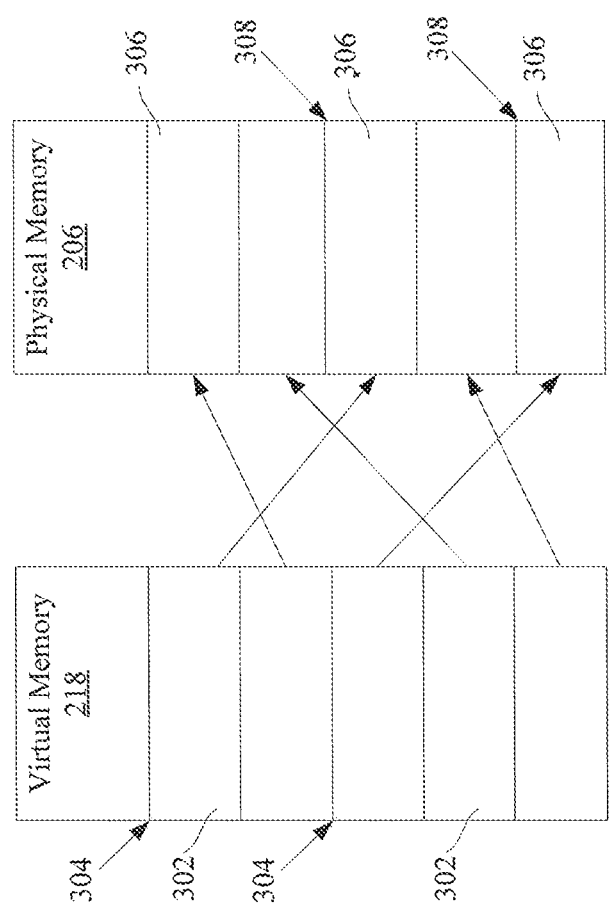
FIG. 3 is a block diagram of a virtual memory and a physical memory, according to an embodiment.

FIG. 3 is a block diagram 300 that illustrates the address mapping between virtual memory and physical memory, according to an embodiment. As illustrated in FIG. 3, virtual memory 210 may include one or more virtual pages 302. In an embodiment, the size of each virtual page 302 may be a power of two, and be 4K, 8K, 32K, 1M, 2M, etc.

In an embodiment, each virtual page 302 may have a virtual address 304. Virtual address 304 of virtual page 302 may designate a memory address where virtual page 302 begins, though the implementation is not limited to this embodiment. Each virtual page 302 may include one or more entries, and each entry may store data or instructions for one of applications 204.

In an embodiment, physical memory 206 may be divided into one or more frames 306. Each frame 306 begins at a physical address 308. In a further embodiment, the size of each frame 306 may be the same as the size of each virtual page 302.

In an embodiment, MMU 214 may map each virtual page 302 to a corresponding frame 306. Frame 306 may store data or instructions in physical memory 206 that is accessible to application 204 via virtual address 304 of the corresponding virtual page 302.

In an embodiment, data and/or instructions associated with application 204 may be stored in consecutive virtual pages 302 in virtual memory 210. However, MMU 214 may map the consecutive virtual pages 302 to consecutive or non-consecutive frames 306 in physical memory 206. As illustrated in FIG. 3, consecutive virtual pages 302 are mapped to non-consecutive frames 306 in physical memory 206.

In a further embodiment, each virtual page 302 and corresponding frame 306 may store both data and instructions for one of applications 204.

Going back to FIG. 2, in an embodiment MMU 214 may include an in-memory page table 215. In-memory page table 215 may have multiple page entries, where each page entry stores the address mapping between virtual page 302 in virtual memory 210 and corresponding frame 306 in physical memory 206.

To optimize access to physical memory 206, MMU 214 may use a table look-aside buffer or TLB 216. In an embodiment, TLB 216 may be included in MMU 214, processor chip 212, between processor chip 212 and physical memory 206, or between different levels of a multi-level cache included in physical memory 206, if any. TLB 216 may be a memory cache that may reduce the amount of time processor 213 may require to access frame 306 when processor 213 receives a corresponding virtual page 302. This is because TLB 216 maps virtual pages 302 to frames 306 based on previous memory access operations and uses fast access techniques to determine the needed address mapping. As such, once MMU 214 retrieves the address mapping between virtual page 302 and frame 306 from in-memory page table 215, MMU 214 may store the address mapping in TLB 216.

Figure 4:
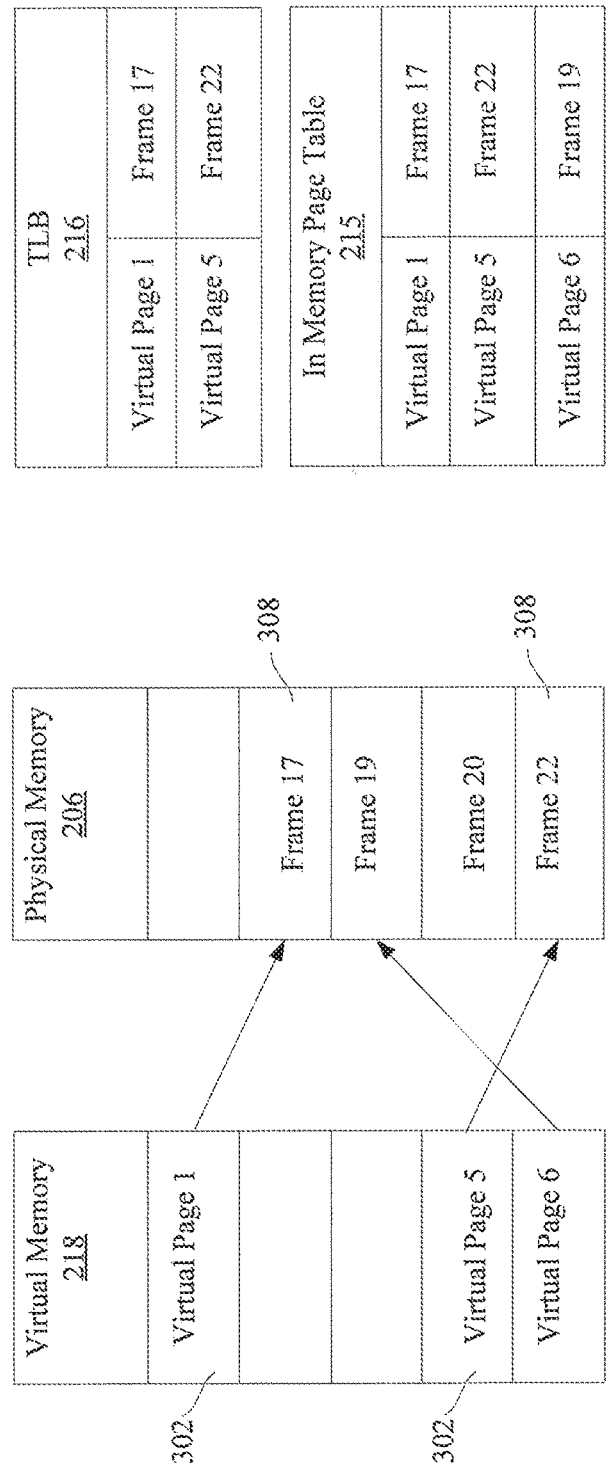
FIG. 4 is a block diagram of a translation look-aside buffer that maps the virtual pages in the virtual memory to the frames in the physical memory, according to an embodiment.

FIG. 4 is a block diagram of a TLB that maps the virtual pages in the virtual memory to the frames in the physical memory, according to an embodiment. As illustrated in FIG. 4, virtual memory 210 includes multiple virtual pages 302, such as virtual page 1, virtual page 5, and virtual page 6 that store data or instructions. Further, physical memory 206 includes frames 306, such as frame 17, frame 19, and frame 22. As also illustrated in FIG. 4, MMU 214 maps virtual page 1 to frame 17, virtual page 5 to frame 19, and virtual page 6 to frame 22. In an embodiment, MMU 214 stores the address mappings between virtual pages 302 and frames 306 in in-memory page table 215, and after the first access also in TLB 216.

In an embodiment, when MMU 214 receives a request for instructions or data stored in virtual page 1, MMU 214 may access TLB 216 to retrieve physical address 308 of frame 17. Once MMU 214 obtains the physical address 308 of frame 17, processor 213 may retrieve the data or instructions stored in frame 17. In another embodiment, MMU 214 may access TLB 216 for virtual page 6. Since, in the illustrated embodiment TLB 216 does not store the address mapping between virtual page 6 and frame 22, MMU 214 may then access in-memory page table 215 for the address mapping between virtual page 6 and frame 17.

Going back to FIG. 2, there may be multiple TLBs 216 in computing device 202. Example TLBs 216 may be an instruction TLB ("ITLB") or a data TLB ("DTLB") in some embodiments. ITLB may map virtual pages 302 to frames 306 when there is a request to read or write instructions that may be executed by processor 213. DTLB may map virtual pages 302 to frames 306 when there is a request to read or write data.

Figure 5:
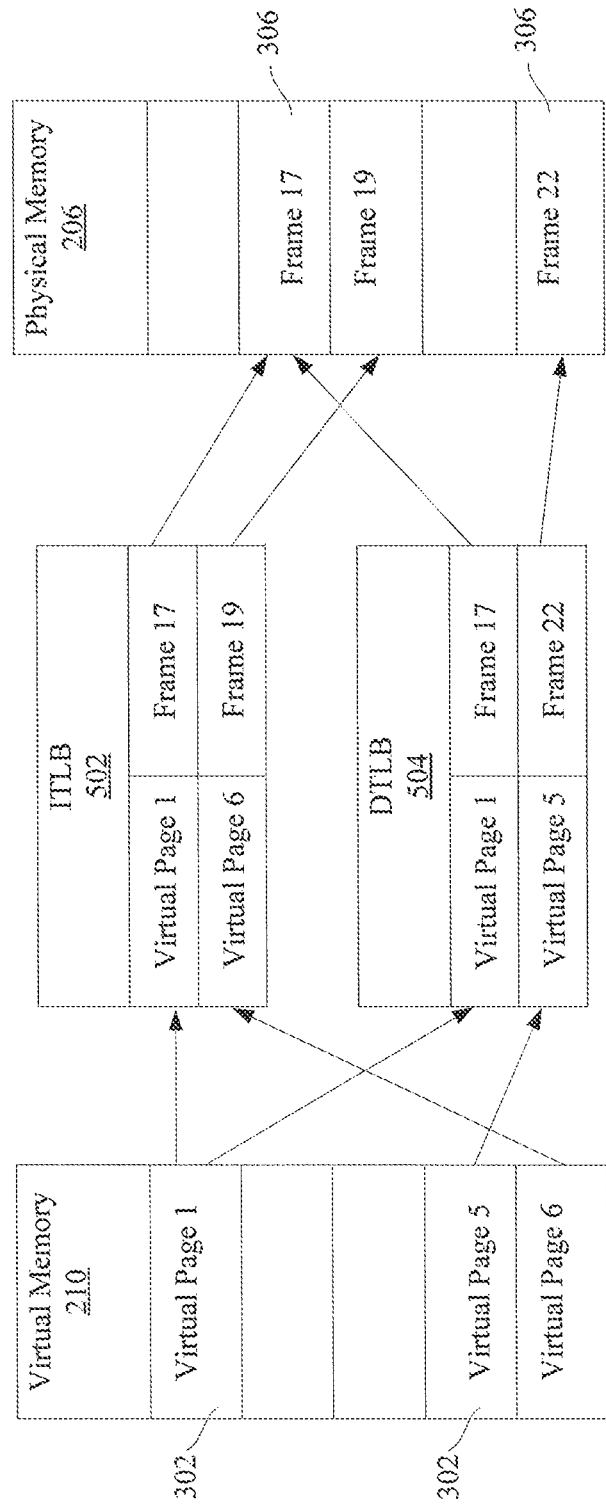
FIG. 5 is a block diagram of an instruction look-aside buffer and a data look-aside buffer that store address mappings between the virtual pages in the virtual memory and frames in the physical memory, according to an embodiment.

FIG. 5 is a block diagram 500 illustrating an ITLB and a DTLB that store address mappings between the virtual pages in the virtual memory and frames in the physical memory, according to an embodiment. As illustrated in FIG. 5, ITLB 502 maps virtual pages 302 to frames 306 when processor 213 receives a request for instructions. For example, when operating system 208 requests for processor 213 to retrieve an instruction stored in virtual page 1, MMU 214 accesses ITLB 502. MMU 214 then uses the address mapping in ITLB 502 to retrieve physical address 308 of frame 17 mapped to virtual address 304 of virtual page 1. Using physical address 308 of frame 17, processor 213 retrieves instructions stored in frame 17. Similarly, when processor 213 requests instructions stored in virtual page 6, MMU 214 uses ITLB 502 to retrieve physical address 308 of frame 18 mapped to virtual address 304 of virtual page 6. Processor 213 then retrieves the instruction stored in frame 18.

As also illustrated in FIG. 5, when operating system 208 requests for processor 213 to request data stored in virtual page 1, MMU 214 accesses DTLB 504. MMU 214 then uses the address mapping in DTLB 504 to retrieve physical address 308 of frame 17 mapped to virtual address 308 of virtual page 1. Using physical address 308 of frame 17, processor 213 retrieves the data stored in frame 17. Similarly, when processor 213 requests data stored in virtual page 5, MMU 214 uses DTLB 504 to retrieve physical address 304 of frame 22 mapped to virtual address 304 of virtual page 5. Processor 213 then retrieves the data stored in frame 17.

In a further embodiment, application 204 may read, write, and/or modify data and instructions in the same virtual page 302. Further, application 204 is likely to access both instructions and data stored in frame 306 from the corresponding virtual page 302. Accordingly, as application 204 executes, MMU 214 may store the address mapping between virtual page 302 and a corresponding frame 306 in both ITLB 502 and DTLB 504.

Going back to FIG. 2, TLB 216 may be used to detect malicious software or processes and/or threads spawned by the malicious software that executes within computing device 202, in some embodiments. To detect malicious software, computing device 202 may utilize TLB watcher 118. In one embodiment, TLB watcher 118 may be implemented in software and be one of applications 204. In another embodiment, TLB watcher 118 may be implemented in hardware.

In an embodiment, TLB watcher 118 may scan TLBs 216, such as ITLB 502 and DTLB 504. During the scan, TLB watcher 118 may determine instances in the address mappings between virtual page 302 and frame 306 in ITLB 502 and DTLB 504 that indicate that malicious software is present. Such instances are based on a premise that genuine processes and threads spawned by applications 204 are likely to have the same address mappings between virtual pages 302 and frames 306 in both ITLB 502 and DTLB 504, according to an embodiment.

Figure 6A:
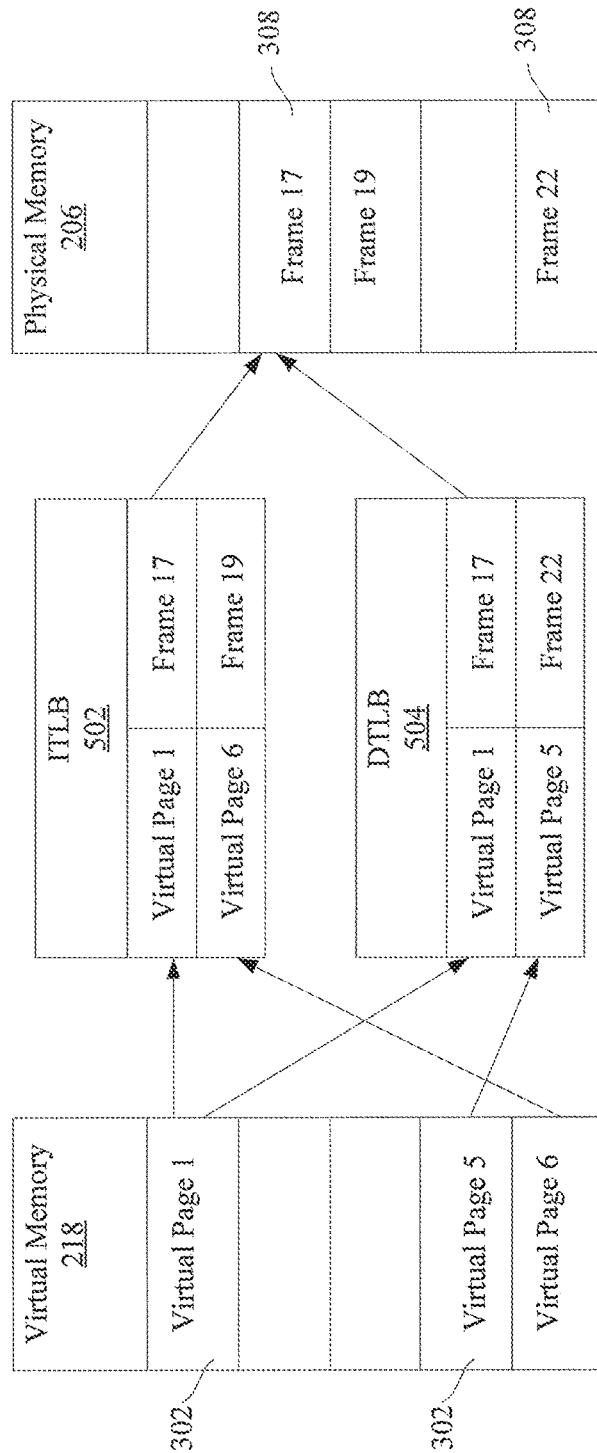
FIGS. 6A-6F are block diagrams of an instruction look-aside buffer and a data look-aside buffer that store address mappings between the virtual pages in the virtual memory and the frames in the physical memory that identify a genuine or malicious process, according to an embodiment.

FIG. 6A is a block diagram 600A of an ITLB and a DTLB that store address mappings between the virtual pages in the virtual memory and the frames in the physical memory that identify a genuine process, according to an embodiment. In an embodiment, TLB watcher 118 may scans ITLB 502 and DTLB 504 illustrated in FIG. 6A. The scan may identify that virtual address 304 of virtual page 1 maps to physical address 308 of frame 17 in ITLB 502 and DTLB 504. Accordingly, TLB watcher 118 determines that process or thread of application 204 that stores data and instructions in frame 17 is a genuine process. In an embodiment, TLB watcher 118 repeats the same analysis for other address mappings between virtual pages 302 and frames 306 in ITLB 502 and DTLB 504.

Going back to FIG. 2, TLB watcher 118 may also identify an instance where virtual page 302 stored in ITLB 502 maps to a different frame 306 than the same virtual page 302 stored in DTLB 504 for the same process. In this case, TLB watcher 118 may identify a process that stores data and instructions in different frames 306 as a malicious process.

Figure 6B:
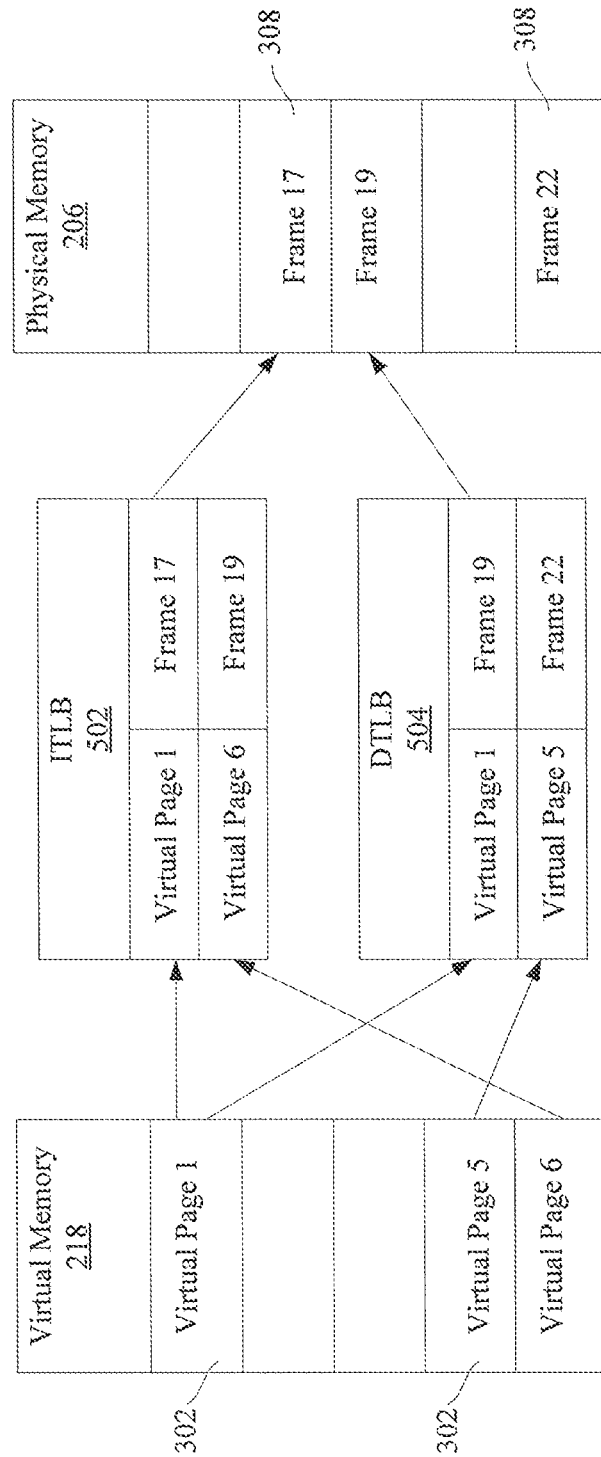

FIG. 6B is a block diagram 600B of an ITLB and a DTLB that store address mappings between the virtual pages in the virtual memory and the frames in the physical memory that identify a malicious process, according to an embodiment. As illustrated in FIG. 6B, TLB watcher 118 determines that virtual address 304 or virtual page 1 maps to physical address 308 of frame 17 in ITLB 502, while virtual address 304 of virtual page 1 maps to physical address 308 of frame 19 in DTLB 504. Because TLB watcher 118 determines that a process stores instructions in frame 17 (as indicated in ITLB 502), but data in frame 19 (as indicated in DTLB 504), TLB watcher 118 may identify the process as a malicious process.

Going back to FIG. 2, in another example, TLB watcher 118 may identify an address mapping between virtual page 302 and frame 306 in DTLB 504 that does not have a corresponding address mapping for virtual page 302 and frame 306 in ITLB 502. In this case, TLB watcher 118 does not identify a process that causes MMU 214 to store the address mapping between virtual page 302 and frame 306 in DTLB 504 and not ITLB 502 as a malicious process. This is because data, unlike instructions, cannot be executed by processor 213 and cannot cause harm to computing device 102 or one or more users.

Figure 6C:
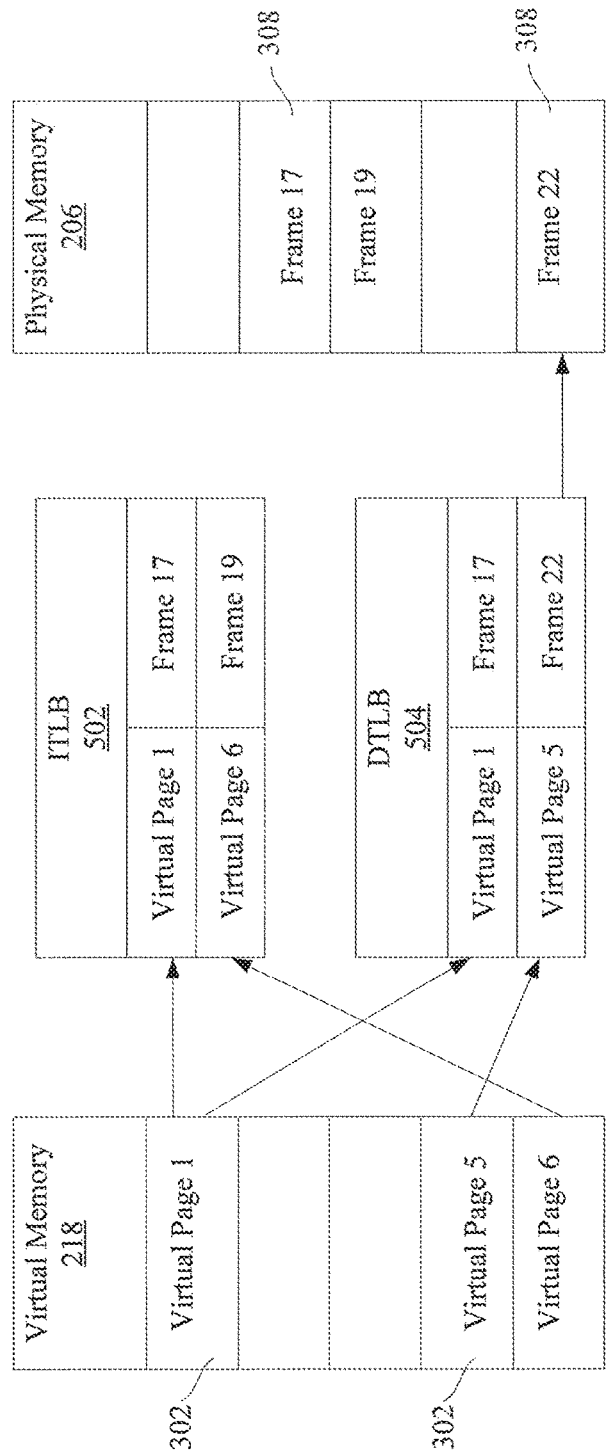

FIG. 6C is a block diagram 600C of an ITLB and a DTLB that store address mappings between the virtual pages in the virtual memory and the frames in the physical memory that identify a non-malicious process, according to an embodiment. As illustrated in FIG. 6C, TLB watcher 118 identifies a process that causes MMU 214 to store virtual address 304 of virtual page 5 in DTLB 504 that maps to physical address 308 of frame 22. But, the process does not cause MMU 214 to store the same address mapping in ITLB 502. However, because processor 113 does not execute data stored in frame 22, TLB watcher 118 does not identify a process that caused MMU 214 to map virtual address 304 of virtual page 5 to different frames 206 in ITLB 502 and DTLB 504 as a malicious process.

Figure 6D:
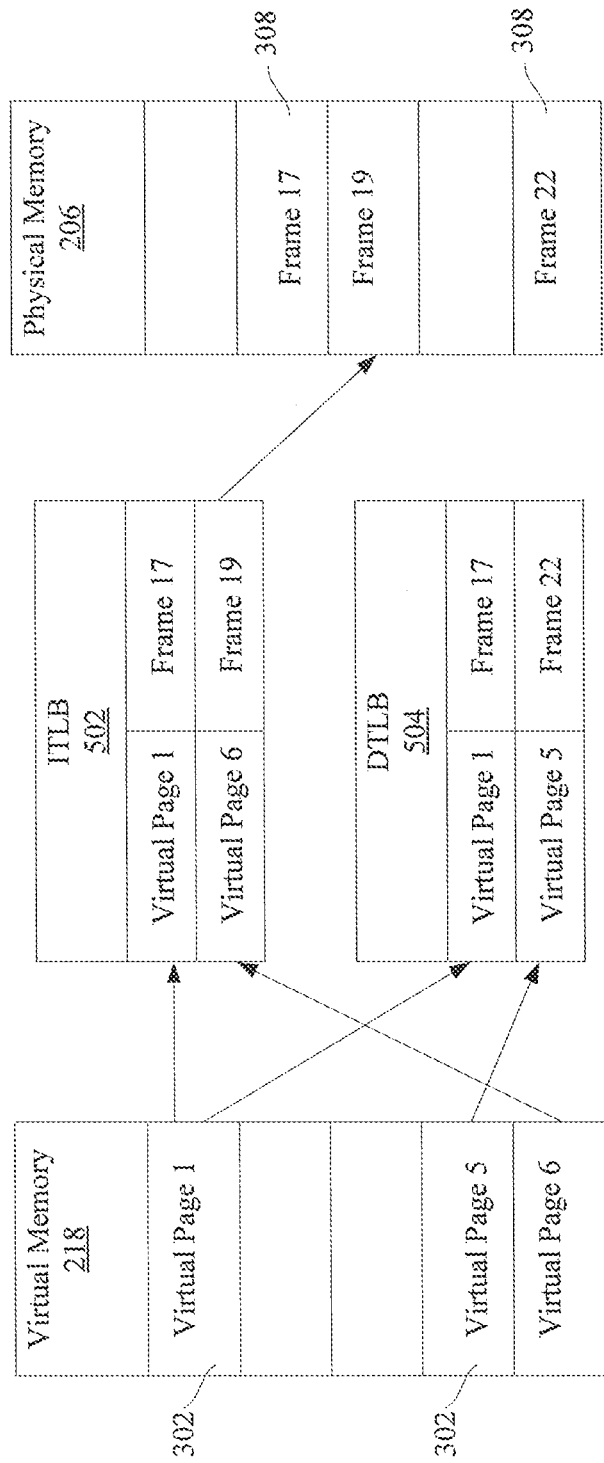

Going back to FIG. 2, in yet another example, TLB watcher 118 may identify a mapping between virtual address 304 of virtual page 302 and physical address 308 of frame 306 in ITLB 502, but not the same address mapping in DTLB 504. FIG. 6D is a block diagram 600D that illustrates an address mapping between virtual page and frame in the ITLB but not in the DTLB, according to an embodiment. As illustrated in FIG. 6D, ITLB 502 stores a mapping between virtual address 304 of virtual page 6 and physical address 308 of frame 19. DTLB 504, however, does not have a mapping between virtual address 304 of virtual page 6 and physical address 308 of frame 19.

When there is an address mapping in ITLB 502 but not in DTLB 504, processor 213 may retrieve and execute instructions from frame 19 that may or may not be malicious software. In this case, TLB watcher 118 may perform further operations to determine whether there is a malicious process that stores instructions in frame 19.

In an embodiment, TLB watcher 118 may spawn a process or thread that mimics operations that insert an address mapping for virtual page 6 into DTLB 504. The example operations may be a write operation into virtual page 6 followed by a read operation into virtual page 6. In this way, TLB watcher 118 inserts an entry into DTLB 504 that has an address mapping for virtual page 6 that exists in ITLB 502, but that may or may not map to the same frame 306 in DTLB 504 as frame 19 in ITLB 502.

Figure 6E:
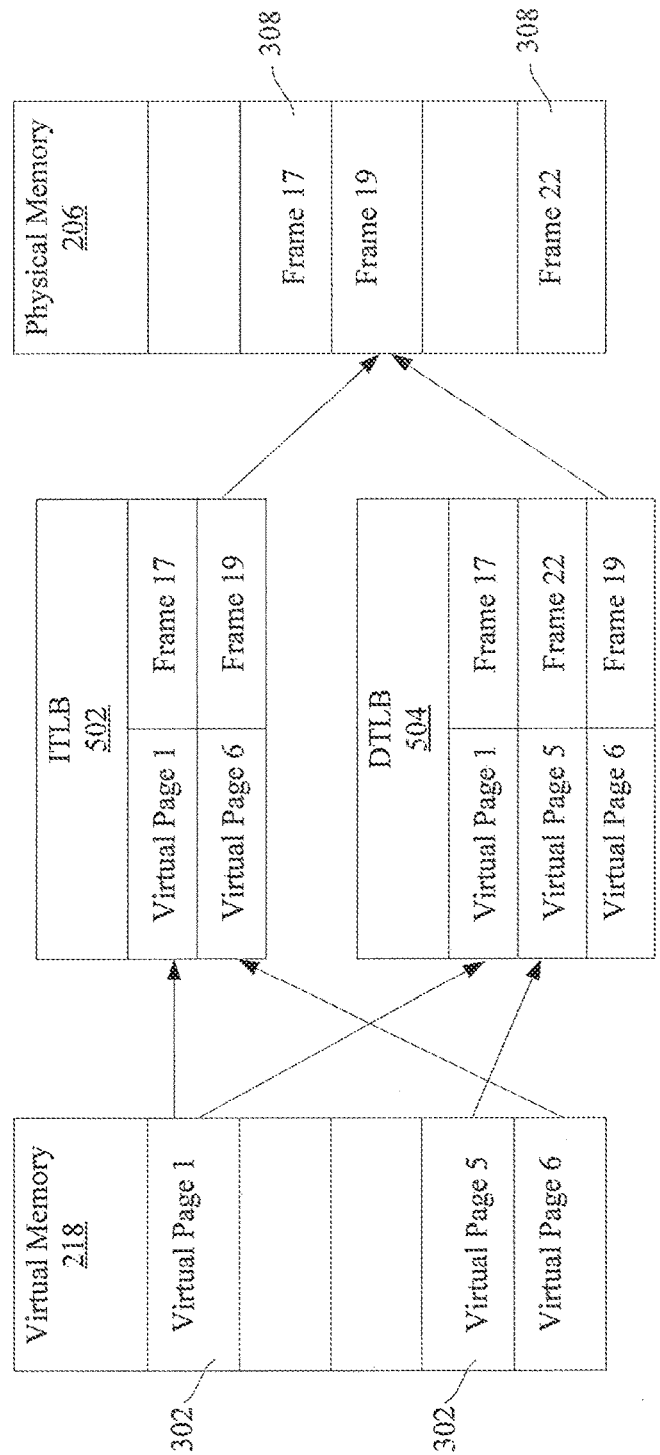

In an embodiment when a write operation and a read operation generate the same address mapping between virtual page 302 and frame 306 in DTLB 504 as in ITLB 502, TLB watcher 118 does not identify a malicious process. FIG. 6E is a block diagram 600E where an ITLB and a DTLB store the same address mappings between the virtual pages in the virtual memory and the frames in the physical memory, according to an embodiment. As illustrated in FIG. 6E, a write operation followed by a read operation generate an address mapping in DTLB 504 between virtual page 6 and frame 19 that also existed in ITLB 502 shown in FIG. 6D. Because the address mapping between virtual page 6 and frame 19 exists in ITLB 502 and DTLB 504, TLB watcher 118 does not identify a process that generated the address mapping as a malicious process, according to an embodiment.

In an embodiment, when the write operation and the read operation generate a different address mapping between virtual page 302 and frame 306 in DTLB 504 than the address mapping between the same virtual page 302 and frame 306 that is stored in ITLB 502, TLB watcher 118 may identify a process as a malicious process.

Figure 6F:
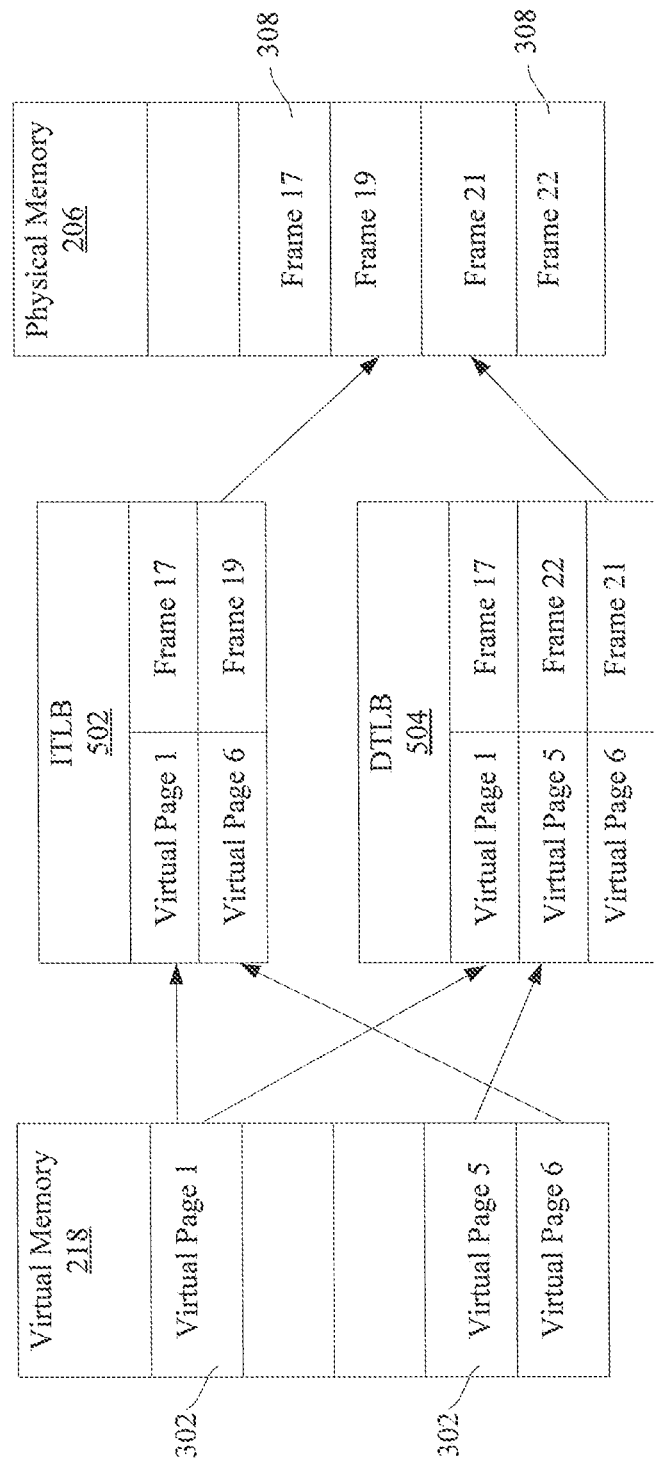

FIG. 6F is a block diagram 600F where an ITLB and a DTLB store address mappings between the virtual pages in the virtual memory and the frames in the physical memory that identify a malicious process, according to an embodiment. As illustrated in FIG. 6F, a write operation followed by a read operation generate an address mapping in DTLB 504 between virtual page 6 and frame 21. This address mapping in DTLB 504, however, does not match the address mapping between virtual page 6 and frame 19 in ITLB 502. Because the same address mapping for virtual page 6 does not exist in ITLB 502 and DTLB 504, TLB watcher 118 may identify a process that generated the address mapping as a malicious process, according to an embodiment.

Going back to FIG. 2, in an embodiment, instead of performing a write operation followed by a read operation, TLB watcher 118 may spawn a process that scans the portion of virtual memory 210 assigned to the process that generated an address mapping in ITLB 502 but not in DTLB 504. In an embodiment, scanning the portion of virtual memory 210 associated with the process may also populate DTLB 504 with an address mapping of the same virtual page 302 to the same or different frame 306 as the address mapping in ITLB 502. Subsequently, TLB watcher 118 may determine whether the process is a malicious process as described in FIGS. 6E and 6F, according to an embodiment.

In an embodiment, when TLB watcher 118 identifies a process or a thread that generates address mappings between virtual page 302 and frame 306 in ITLB 502 and the same virtual page 302 but different frame 306 in DTLB 504, TLB watcher 118 identifies a malicious process. In this case, TLB watcher 118 may perform further operations that prevent processor 213 from executing the malicious code in frame 306 that can be accessed via virtual page 302 in ITLB 502. For example, TLB watcher 118 may block processor 213 from accessing frame 306 that includes the malicious code. In another example, TLB watcher 118 may also generate an alert to a user using computing device 202 or to a system administrator. In yet another example, TLB watcher 118 may create a container that can execute in computing device 202. Such a container cannot access portions of memory that include sensitive information. TLB watcher 118 may then instruct processor 213 to execute the malicious code in the container. In yet another embodiment, TLB watcher 118 may be configured to generate one of the above actions, or another action that prevents or contains execution of malicious code in computing device 202.

In yet another embodiment, address mappings that are stored in ITLB 502 and DTLB 504 may be address mappings for a single process of application 204. In this case, TLB watcher 118 may scan ITLB 502 and DTLB 504 as an atomic operation. An atomic operation is operation that occurs instantaneously or as close to instantaneously as technologically possible. In an embodiment, TLB watcher 118 may perform an atomic operation to ensure that a context switch between processes does not occur while TLB watcher 118 scans ITLB 502 and DTLB 504. This is because, once a context switch occurs processor 213 may execute requests made by a different process or a different application 204. In this case, ITLB 502 and DTLB 504 may have entries from multiple processes and this may cause TLB watcher 118 to scan address mappings in ITLB 502 and DTLB 504 from different processes and cause discrepancies between virtual pages 302 and corresponding frames 306. This, in turn, may cause TLB watcher 118 to identify genuine process as a malicious process.

Figure 7:
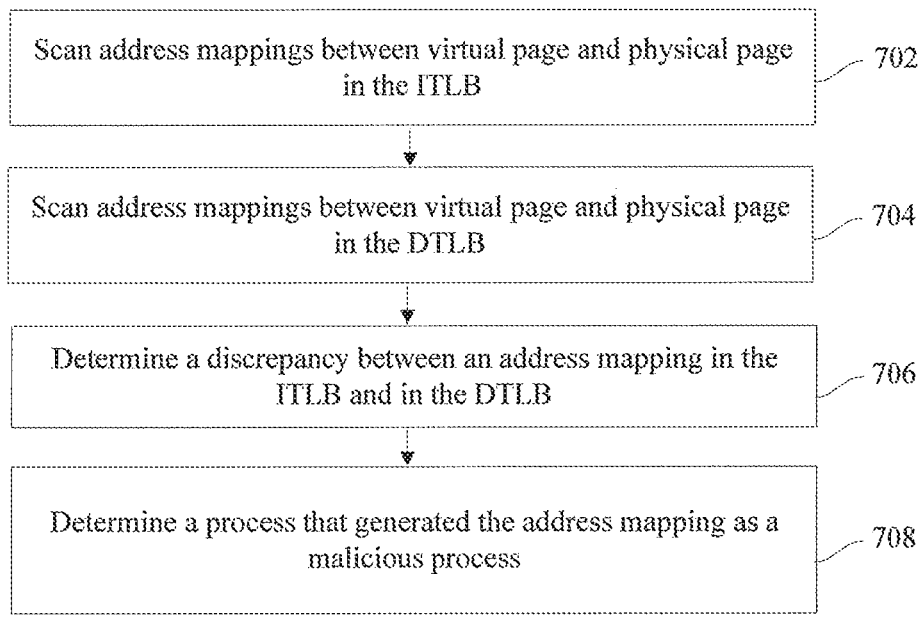
FIGS. 7-9 are flowcharts of methods for identifying malicious software by scanning an instruction look-aside buffer and a data look-aside buffer, according to an embodiment.

FIG. 7 is a flowchart of a method 700 for identifying a malicious process by scanning an ITLB and a DTLB, according to an embodiment. Method 700 may be implemented using hardware and software components described in FIGS. 1-6. Note that one or more of the operations may be deleted, combined, or performed in a different order as appropriate.

At operation 702, an ITLB is scanned. For example, TLB watcher 118 scans address mappings between virtual pages 302 and frames 306 stored in ITLB 502.

At operation 704, a DTLB is scanned. For example, TLB watcher 118 scans address mappings between virtual pages 302 and frames 306 stored in DTLB 504. In an embodiment, TLB watcher 118 may performs operations 702 and 704 sequentially or in parallel.

At operation 706, a discrepancy in an address mapping in the ITLB and the DTLB is identified. For example, TLB watcher 118 identifies an address mapping between virtual page 1 and frame 17 in ITLB 502, but an address mapping between virtual page 1 and frame 19 in DTLB 504 as illustrated in FIG. 6B.

At operation 708, a malicious process is detected based on the discrepancy. In an embodiment, because of the discrepancy in operation 706, TLB watcher 118 identifies a process that caused MMU 214 to map virtual address 304 of virtual page 1 to physical address 308 of frame 17 in ITLB 502, and virtual address 304 of virtual page 1 to physical address 308 of frame 19 in DTLB 504 as a malicious process.

Figure 8:
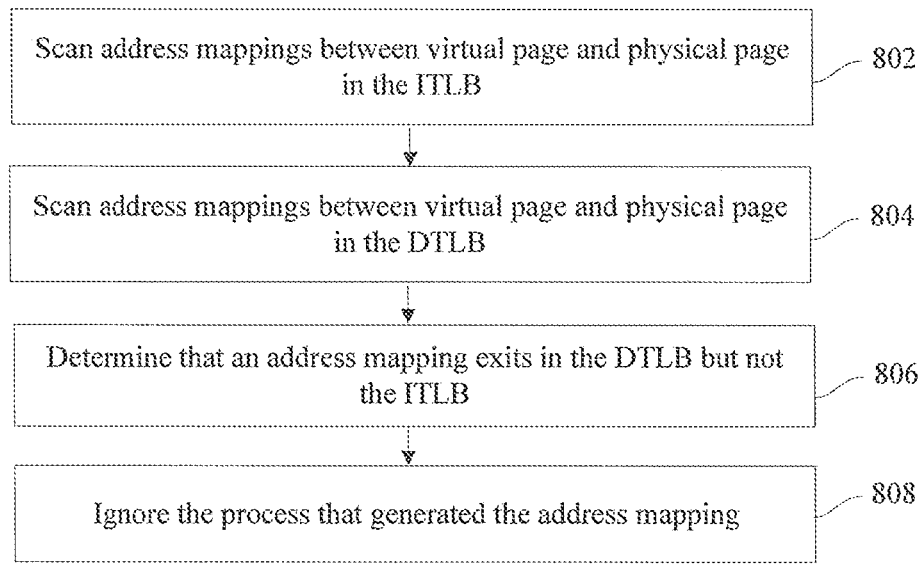

FIG. 8 is a flowchart of a method 800 for identifying a malicious process by scanning ITLB and DTLB, according to an embodiment. Method 800 may be implemented using hardware and software components described in FIGS. 1-6. Note that one or more of the operations may be deleted, combined, or performed in a different order as appropriate.

At operation 802, an ITLB is scanned as discussed in operation 702.

At operation 804, a DTLB is scanned as discussed in operation 704.

At operation 806, an address mapping in the DTLB that does not exist in the ITLB is identified. For example, TLB watcher 118 identifies an address mapping between virtual page 5 and frame 22 that exits in DTLB 504, but not in ITLB 502.

At operation 808, neither malicious nor non-malicious process is identified. In an embodiment, based on the address mapping identified in operation 806, TLB watcher 118 may ignore the process because processor 213 cannot execute data in frame 22.

Figure 9:
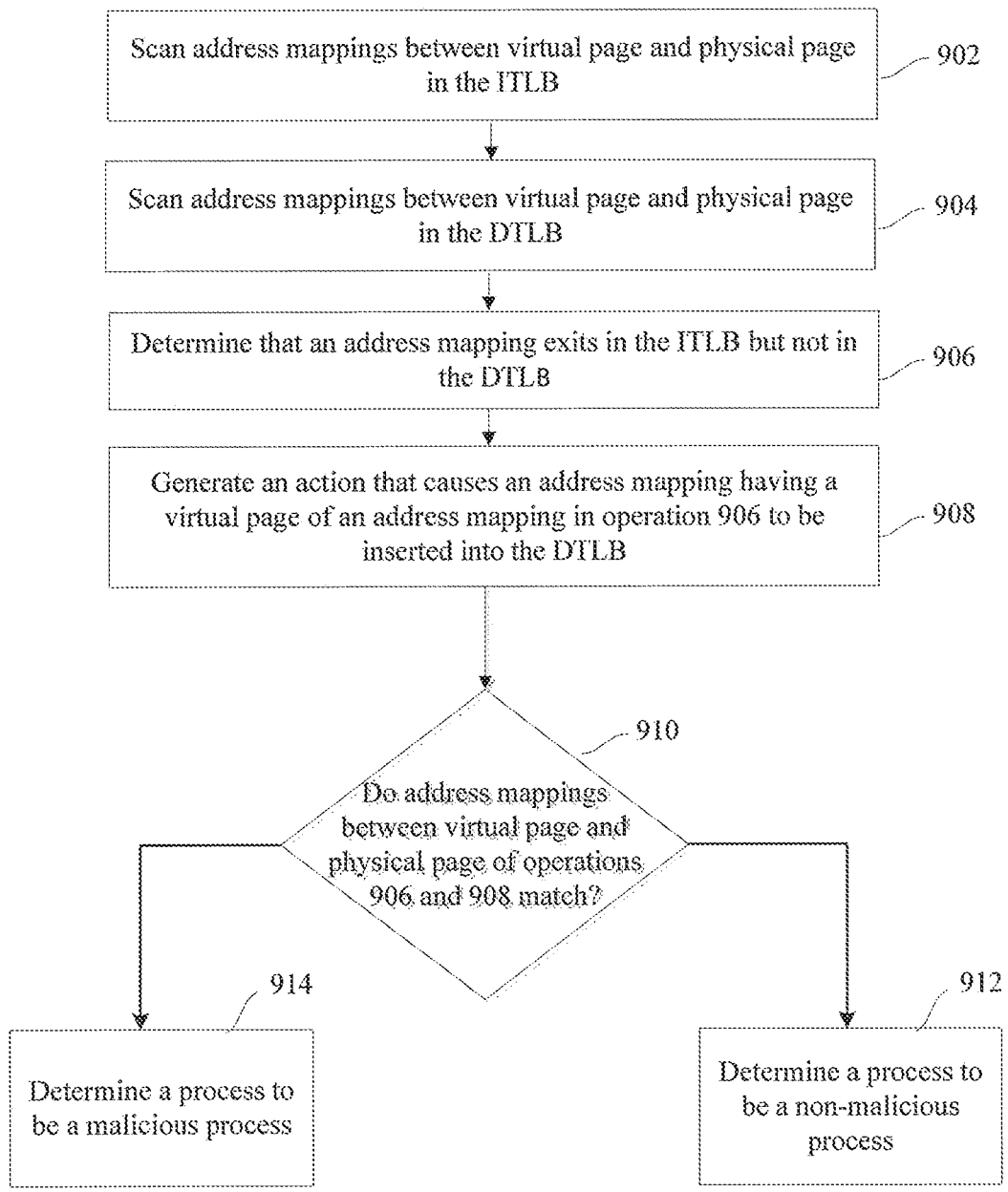

FIG. 9 is a flowchart of a method 900 for identifying a malicious process by scanning ITLB and DTLB, according to an embodiment. Method 900 may be implemented using hardware and software components described in FIGS. 1-6. Note that one or more of the operations may be deleted, combined, or performed in a different order as appropriate.

At operation 902, an ITLB is scanned as discussed in operation 702.

At operation 904, a DTLB is scanned as discussed in operation 704.

At operation 906, an address mapping in the ITLB that does not exist in the DTLB is identified. For example, TLB watcher 118 identifies an address mapping in ITLB 502 that does not exist in DTLB 504. This is illustrated in FIG. 6D where ITLB 502 has an address mapping between virtual page 6 and frame 19, while DTLB 504 does not.

At operation 908, an action that inserts an address mapping into DTLB is performed. For example, TLB watcher 118 generates an action, such as a write operation followed by a read operation that inserts an address mapping for virtual page 6 into DTLB 504. This is illustrated in FIGS. 6E and 6F, where there is an address mapping for virtual page 6 in ITLB 502 and in DTLB 504.

At operation 910, a determination is made whether an address mapping identified in ITLB is operation 906 is the same as the address mapping inserted into DTLB in operation 908. If the address mappings between virtual page 302 and frame 306 in ITLB 502 and DTLB 504 are the same, the flowchart proceeds to operation 912. This is illustrated in FIG. 6E, where the address mapping of virtual page 6 to frame 19 is stored in ITLB 502 and DTLB 504. Otherwise, the flowchart proceeds to 914. This is illustrated in FIG. 6F, where the address mapping of virtual page 6 is to frame 19 in ITLB 502 and to frame 21 in DTLB 504.

At operation 912, a non-malicious process is identified. For example, TLB watcher 118 does not identify a malicious process that stores the address mapping between virtual page 6 and frame 19 in both ITLB 502 and DTLB 504. This is because a non-malicious process has the same address mapping in ITLB 502 and DTLB 504.

At operation 914 a malicious process is identified. For example, because the address mapping of virtual page 6 is different in ITLB 502 and DTLB 504, TLB watcher 118 identifies a process as a malicious process.

Figure 10:
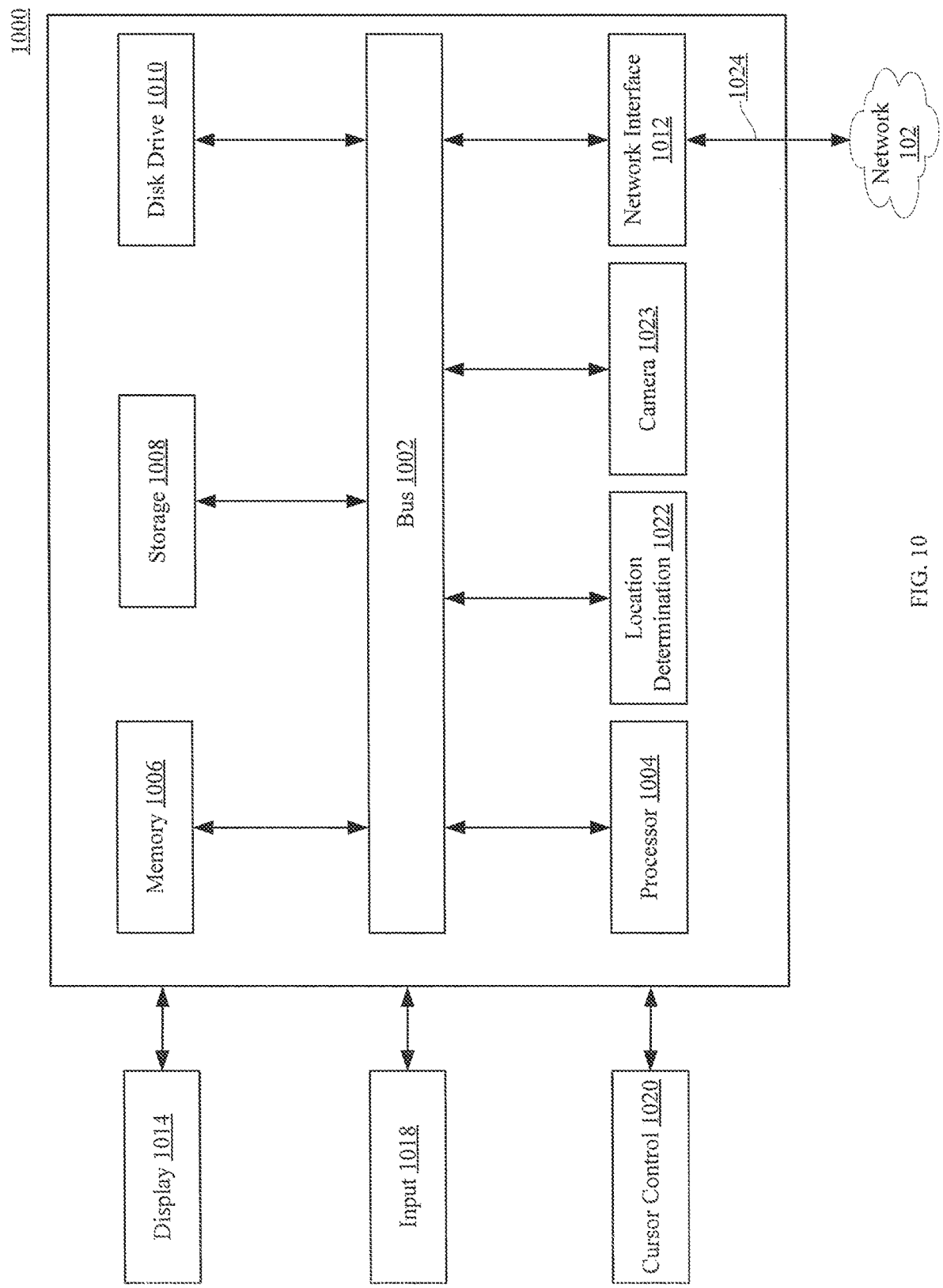
FIG. 10 is a schematic view illustrating an embodiment of a computing system.

Referring now to FIG. 10 an embodiment of a computer system 1000 suitable for implementing, the systems and methods described in FIGS. 1-9 is illustrated.

In accordance with various embodiments of the disclosure, computer system 1000, such as a computer and/or a server, includes a bus 1002 or other communication mechanism for communicating information, which interconnects subsystems and components, such as a processing component 1004 (e.g., processor, micro-controller, digital signal processor (DSP), FPGA, etc.), a system memory component 1006 (e.g., RAM), a static storage component 1008 (e.g., ROM), a disk drive component 1010 (e.g., magnetic or optical), a network interface component 1012 (e.g., modem or Ethernet card), a display component 1014 (e.g., CRT or LCD), an input component 1018 (e.g., keyboard, keypad, or virtual keyboard), a cursor control component 1020 (e.g., mouse, pointer, or trackball), a location determination component 1022 (e.g., a Global Positioning System (GPS) device as illustrated, a cell tower triangulation device, and/or a variety of other location determination devices known in the art), and/or a camera component 1023. In one implementation, the disk drive component 1010 may comprise a database having one or more disk drive components.

In accordance with embodiments of the disclosure, the computer system 1000 performs specific operations by the processing component 1004 executing one or more sequences of instructions contained in the memory component 1006, such as described herein with respect to the mobile communications devices, mobile devices, and/or servers. Such instructions may be read into the system memory component 1006 from another computer readable medium, such as the static storage component 1008 or the disk drive component 1010. In other embodiments, hardwired circuitry may be used in place of or in combination with software instructions to implement the disclosure.

Logic may be encoded in a computer readable medium, which may refer to any medium that participates in providing instructions to the processing component 1004 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1010, volatile media includes dynamic memory, such as the system memory component 1006, and transmission media includes coaxial cables, copper wire, and fiber optics, including wires that comprise the bus 1002. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 1000. In various other embodiments of the disclosure, a plurality of the computer systems 1000 coupled by a communication link 1024 to the network 134 (e.g., such as a LAN, WLAN, PTSN, and/or various other wired or wireless networks, including telecommunications, mobile, and cellular phone networks) may perform instruction sequences to practice the disclosure in coordination with one another.

The computer system 1000 may transmit and receive messages, data, information and instructions, including one or more programs (i.e., application code) through the communication link 1024 and the network interface component 1012. The network interface component 1012 may include an antenna, either separate or integrated, to enable transmission and reception via the communication link 1024. Received program code may be executed by processing component 1004 as received and/or stored in disk drive component 1010 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A system, comprising:
   a non-transitory memory storing instructions; and
   one or more hardware processors coupled to the non-transitory memory and configured to read the instructions from the non-transitory memory to cause the system to perform operations comprising:
   scanning a plurality of address mappings between a virtual memory and a physical memory in an instruction table look-aside buffer (ITLB);
   scanning a plurality of address mappings between the virtual memory and the physical memory in a data table look-aside buffer (DTLB);
   determining a discrepancy between an address mapping from the address mappings in the ITLB and an address mapping from the address mappings in the DTLB; and
   determining whether a process is a malicious process based on the discrepancy.

2. The system of claim 1, wherein each of the plurality of address mappings in the ITLB maps a virtual address of a virtual page in the virtual memory to a physical address of a frame in the physical memory.

3. The system of claim 1, wherein each of the plurality of address mappings in the DTLB maps a virtual address of a virtual page in the virtual memory to a physical address of a frame in the physical memory.

4. The system of claim 1, wherein determining the discrepancy further comprises:
   determining a virtual address of the address mapping in the ITLB that matches a virtual address of the address mapping in the DTLB;
   determining a physical address of the address mapping in the ITLB that is different from a physical address of the address mapping in the DTLB; and
   determining the process associated with the address mappings in the ITLB and the DTLB is the malicious process.

5. The system of claim 1, wherein determining the discrepancy further comprises:
   determining a virtual address of the address mapping in the ITLB that matches a virtual address of the address mapping in the DTLB;
   determining a physical address of the address mapping in the ITLB that matches a physical address of the address mapping in the DTLB; and
   determining the process associated with the address mapping in the ITLB and the DTLB is a non-malicious process.

6. The system of claim 1, wherein determining the discrepancy further comprises:
   determining that a virtual address of the address mapping in the ITLB does not match the virtual address in the address mapping in the DTLB;
   generating an action that inserts an address mapping into the DTLB, wherein the address mapping has a matching virtual address as the address mapping in the ITLB;
   comparing a physical address of the address mapping in the ITLB to a physical address of the inserted address mapping in the DTLB; and
   determining the process associated with the address mapping in the ITLB is the malicious process when the physical address of the address mapping in the ITLB does not match to the physical address of the inserted address mapping in the DTLB.

7. The system of claim 6, wherein the action writes data into the virtual address in the DTLB that matches the virtual address in the address mapping in the ITLB, and reads data from the virtual address.

8. The system of claim 1, wherein determining the discrepancy further comprises:
   determining that a virtual address of the address mapping in the DTLB does not have a matching virtual address in the address mapping in the ITLB; and
   ignoring the process associated with the address mapping in the DTLB when the virtual address of the address mapping in the DTLB does not have the matching virtual address in the address mapping in the ITLB.

9. A method, comprising:
   scanning address mappings in an instruction table look-aside buffer (ITLB), wherein each address mapping in the address mappings includes a virtual address mapped to a physical address;
   scanning address mappings in a data table look-aside buffer (DTLB), wherein each address mapping in the address mappings includes a virtual address mapped to a physical address;
   determining a discrepancy between an address mapping in the ITLB and an address mapping in the DTLB; and
   determining whether a process is a malicious process based on the discrepancy.

10. The method of claim 9, wherein determining the discrepancy further comprises:
    determining a virtual address of the address mapping in the ITLB that matches a virtual address of the address mapping in the DTLB;
    determining a physical address of the address mapping in the ITLB that is different from a physical address of the address mapping in the DTLB; and
    determining the process associated with the address mapping in the ITLB and the DTLB is the malicious process.

11. The method of claim 9, wherein determining the discrepancy further comprises:
    determining a virtual address of the address mapping in the ITLB that matches a virtual address of the address mapping in the DTLB;
    determining a physical address of the address mapping in the ITLB matches a physical address of the address mapping in the DTLB; and
    determining the process associated with the address mapping in the ITLB and the DTLB is a non-malicious process.

12. The method of claim 9, wherein determining the discrepancy further comprises:
    determining that a virtual address of the address mapping in the ITLB does not have a matching virtual address in the address mapping in the DTLB;
    generating an action that inserts an address mapping into the DTLB, wherein the address mapping has a matching virtual address as the address mapping in the ITLB;
    comparing a physical address of the address mapping in the ITLB to a physical address of the inserted address mapping in the DTLB; and
    determining the process associated with the address mapping in the ITLB is the malicious process when the physical address of the address mapping in the ITLB does not match to the physical address of the inserted address mapping in the DTLB.

13. The method of claim 9, further comprising:
    generating an alert once the process is identified as the malicious process.

14. The method of claim 9, wherein determining the discrepancy further comprises:
- determining that a virtual address of the address mapping in the DTLB does not have a matching virtual address in the address mapping in the ITLB; and
- determining the process associated with the address mapping in the DTLB is a non-malicious process when the virtual address of the address mapping in the DTLB does not have a matching virtual address in the address mapping in the ITLB.

15. A non-transitory machine readable medium having stored thereon machine readable instructions executable to cause a machine to perform operations comprising:
- determining a discrepancy between an address mapping from a plurality of address mappings in an instruction table look-aside buffer (ITLB) and an address mapping from a plurality of address mappings in a data look-aside buffer (DTLB), wherein the address mapping in the ITLB maps a first virtual address of a first virtual page in a virtual memory to a first physical address of a first frame in a physical memory and wherein the address mapping in the DTLB maps a second virtual address of a second virtual page in the virtual memory to a second physical address of a second frame in the physical memory;
- determining whether a process as a malicious process based on the discrepancy; and
- preventing the malicious process from executing on the machine.

16. The non-transitory machine readable medium of claim 15, wherein determining the discrepancy further comprises:
- determining the first virtual address of the address mapping in the ITLB that matches the second virtual address of the address mapping in the DTLB;
- determining the first physical address of the address mapping in the ITLB that matches the second physical address of the address mapping in the DTLB; and
- determining the process associated with the address mapping in the ITLB and the address mapping in the DTLB is a non-malicious process.

17. The non-transitory machine readable medium of claim 15, wherein determining the discrepancy further comprises:
- determining the first virtual address of the address mapping in the ITLB that matches the second virtual address of the address mapping in the DTLB;
- determining the first physical address of the address mapping in the ITLB that is different from the second physical address of the address mapping in the DTLB; and
- determining the process associated with the address mapping in the ITLB and the address mapping in the DTLB is the malicious process.

18. The non-transitory machine readable medium of claim 15, wherein determining the discrepancy further comprises:
- determining that the first virtual address of the address mapping in the ITLB does not match a first virtual address as in the address mapping in the DTLB;
- generating an action that inserts an address mapping into the DTLB, wherein the inserted address mapping has a matching second virtual address as the address mapping in the ITLB;
- comparing the first physical address of the address mapping in the ITLB to a second physical address of the inserted address mapping in the DTLB; and
- determining the process associated with the address mapping in the ITLB is the malicious process when the first physical address of the address mapping in the ITLB does not match to the second physical address of the inserted address mapping in the DTLB.

19. The non-transitory machine readable medium of claim 18, wherein the action writes data into the first virtual address in the DTLB that matches the second virtual address in the address mapping in the ITLB, and reads data from the second virtual address.

20. The non-transitory machine readable medium of claim 15, wherein determining the discrepancy further comprises:
- determining that a first virtual address of the address mapping in the DTLB does not have a matching second virtual address in the address mapping in the ITLB; and
- ignoring the process associated with the address mapping in the DTLB when the first virtual address of the address mapping in the DTLB does not have the matching second virtual address in the address mapping in the ITLB.

* * * * *